(12) United States Patent
Pyun et al.

(10) Patent No.: US 9,651,918 B2
(45) Date of Patent: May 16, 2017

(54) METHOD AND APPARATUS FOR HOLOGRAPHIC RECORDING (71) Applicants: SAMSUNG ELECTRONICS CO., LTD., Suwon-si (KR); SEOUL NATIONAL UNIVERSITY R&DB FOUNDATION, Seoul (KR)

(72) Inventors: Kyoung-seok Pyun, Seoul (KR); Byoung-ho Lee, Seoul (KR); Sun-il Kim, Seoul (KR); Chil-sung Choi, Suwon-si (KR); Soon-gi Park, Seoul (KR); Jung-kwuen An, Cheonan-si (KR); Kee-hoon Hong, Seoul (KR); Ji-woon Yeom, Seoul (KR); Jong-hyun Kim, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 356 days.

(21) Appl. No.: 14/031,193

(22) Filed: Sep. 19, 2013

(65) Prior Publication Data
US 2014/0285863 A1 Sep. 25, 2014

(30) Foreign Application Priority Data
Mar. 20, 2013 (KR) ........................ 10-2013-0029919

(51) Int. Cl.
*G03H 1/26* (2006.01)
*G03H 1/04* (2006.01)

(52) U.S. Cl.
CPC ..... *G03H 1/0476* (2013.01); *G03H 2001/048* (2013.01)

(58) Field of Classification Search
CPC ........ G11B 7/0065; G11B 2007/00653; G11B 2007/00656; G03H 1/00; G03H 1/22; G03H 1/2249; G03H 1/2273; G03H 1/26
USPC ....... 359/1, 8, 10–11, 22–26, 28, 29, 32–33, 359/35; 356/457–458; 396/288
See application file for complete search history.

(56) References Cited

U.S. PATENT DOCUMENTS 7,486,406 B2 2/2009 Kim
8,175,399 B2 5/2012 Hiraga et al.
8,334,889 B2 12/2012 Blanche et al.
(Continued)

FOREIGN PATENT DOCUMENTS

KR 10-2006-0048850 A 5/2006

OTHER PUBLICATIONS

Anna Consortini, "Trends in Optics Research, Developments and Applications", 1196, Academic Oress Limited, pp. 189-206.*

*Primary Examiner* — Ricky Mack
*Assistant Examiner* — Robert E Tallman
(74) *Attorney, Agent, or Firm* — Sughrue Mion, PLLC (57) ABSTRACT Provided is a holographic recording method in which an interference fringe between a reference beam and a signal beam, modulated according to information regarding a plurality of hologram pixels, is recorded on a holographic recording medium, the holographic recording method including multiplexing-recording the interference fringe of the plurality of hologram pixels such that at least a part of the interference fringe recorded of neighboring hologram pixels of the plurality of hologram pixels is overlapped.

14 Claims, 6 Drawing Sheets (56) References Cited

U.S. PATENT DOCUMENTS

| | | | |
|---|---|---|---|
| 2004/0145994 A1* | 7/2004 | Tsukagoshi | G03H 1/12 369/103 |
| 2007/0091399 A1* | 4/2007 | Ihas | G03H 1/26 359/24 |
| 2008/0037088 A1* | 2/2008 | Sako | G03H 1/0486 359/35 |
| 2009/0122376 A1* | 5/2009 | Matoba | G03H 1/26 359/35 |
| 2013/0050790 A1 | 2/2013 | Sung et al. | |

* cited by examiner

| 1 | 2 | 3 | 4 | 5 |
|---|---|---|---|---|
| 6 | ... | ... |   |   |
|   |   |   |   |   |
|   |   |   |   |   |
|   |   |   |   | 25 |

METHOD AND APPARATUS FOR HOLOGRAPHIC RECORDING

CROSS-REFERENCE TO RELATED APPLICATION

This application claims priority from Korean Patent Application No. 10-2013-0029919, filed in the Korean Intellectual Property Office on Mar. 20, 2013, the disclosure of which is incorporated herein by reference in its entirety.

BACKGROUND

1. Field

Apparatuses and methods consistent with exemplary embodiments relate to a method and apparatus for holographic recording.

2. Description of the Related Art

A holographic technology is a technology that may reproduce a signal as a three-dimensional (3D) image by recording an interference fringe between a signal beam containing a signal, and a reference beam. The holographic technology may be utilized in various fields such as in the fields of 3D image recording and reproduction, anti-forgery, genuine article determination, and digital data recording and reproduction. In addition, a micro holographic technology has been commercialized in which a fine interference fringe is recorded on a plate-shaped photosensitive recording film by pixel units so that the 3D image may be seen through a 2D plane.

The holographic recording may be generally performed by splitting beams emitted from the same light source to make signal beams and reference beams, optically modulating the signal beams, and then irradiating the signal beams and the reference beams to the same part of a photosensitive recording film. The modulation of the signal beam may be performed, for example, by a spatial light modulator, according to an interference pattern calculated by a computer based on an image that is to be reproduced from the photosensitive recording film.

Holographic recording considers factors such as optimization of light efficiency, a technology to make a hogel (hologram pixel) in a desired shape, maximization of a fill factor of the hologram pixel, shortening of a recording time, and an increase in resolution.

SUMMARY

One or more exemplary embodiments provide methods and apparatuses for holographic recording.

According to an aspect of an exemplary embodiment, there is provided a holographic recording method in which an interference fringe between a reference beam and a signal beam modulated according to information regarding a plurality of hologram pixels is recorded on a holographic recording medium, includes multiplexing-recording the interference fringe in the plurality of hologram pixels such that at least a part of the interference fringe recorded of neighboring hologram pixels of the plurality of hologram pixels is overlapped.

The multiplexing-recording of the hologram pixels may include recording an interference fringe of a first hologram pixel; moving the holographic recording medium by a distance less than a width of the recorded interference fringe of the first hologram pixel; and recording an interference fringe of a second hologram pixel.

The holographic recording method may further include determining a multiplexing factor M, wherein the moving of the holographic recording medium comprises moving the holographic recording medium by a distance h/M, wherein a width of the recorded interference fringe of the first hologram pixel may be h.

The holographic recording method may further include wherein an exposure time during which the holographic recording medium is exposed to light to record the interference fringe of one hologram pixel is t/M, wherein t is a time during which the holographic recording medium is exposed to light to record the interference fringe of one hologram pixel when M=1.

According to another aspect of an exemplary embodiment, there is provided a holographic recording device with a holographic recording medium on which an interference fringe between a reference beam and a signal beam is recorded, wherein the reference beam and the signal beam are modulated according to information regarding a plurality of hologram pixels, wherein at least a part of interference fringe recorded of neighboring hologram pixels of the plurality of hologram pixels is overlapped with the interference fringe recorded on the holographic recording medium.

According to another aspect of an exemplary embodiment, there is provided a holographic recording apparatus that includes a light source; a signal beam optical system configured to split light from the light source into a reference beam and a signal beam and modulate the split signal beam according to information regarding a hologram pixel to radiate the modulated beam to a holographic recording medium; a reference beam optical system configured to radiate the reference beam to the holographic recording medium, a shutter configured to be opened/closed to regulate a time during which the holographic recording medium is exposed to light; a stage on which the holographic recording medium is arranged, wherein the stage is configured to move according to the hologram pixel and to change a position of the holographic recording medium on which an interference fringe of the hologram pixel is recorded; and a driving control unit configured to control the stage such that the movement of the stage is within a distance less than a width of a recorded hologram pixel when the stage records one hologram pixel and then moves to record the next hologram pixel.

The holographic recording apparatus may further include an input unit configured to receive a multiplexing factor M (where M is a natural number), wherein when the width of the recorded interference fringe of the hologram pixel is h, the driving control unit may move the stage by h/M.

The holographic recording apparatus may further include that the shutter may be opened for t/M to record the interference fringe of the one hologram pixel wherein t is a time during which the holographic recording medium is exposed to light to record the interference fringe of one hologram pixel when M=1.

The signal beam optical system may include a beam splitting/expanding unit configured for splitting a beam from the light source into a reference beam and a signal beam and expanding a diameter of the signal beam; a spatial light modulator configured for modulating the signal beam according to information regarding a hologram pixel; and an objective lens unit configured for focusing the signal beam modulated by the spatial light modulator on a holographic recording medium.

The beam splitting/expanding unit may include a first beam splitter configured for splitting a beam from the light source into a reference beam and a signal beam; and a pair of relay lenses arranged on an optical path of the signal beam and configured to expand the beam.

The spatial light modulator may be a reflective spatial light modulator.

A beam splitter may be further arranged between the beam splitting/expanding unit and the objective lens unit, wherein the beam splitter may be configured to direct light from the beam splitting/expanding unit to the spatial light modulator and direct light modulated by the spatial light modulator to the objective lens unit.

The spatial light modulator may be transmissive.

The spatial light modulator may be arranged between the beam splitting/expanding unit and the objective lens unit.

An optical path changing member may be arranged between the beam splitting/expanding unit and the spatial light modulator, wherein the optical path changing member is configured to redirect light output from the beam splitting/expanding unit to the spatial light modulator.

The reference beam optical system may include an objective lens configured for focusing the reference beam on the holographic recording medium; and at least one mirror configured for regulating an optical path.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
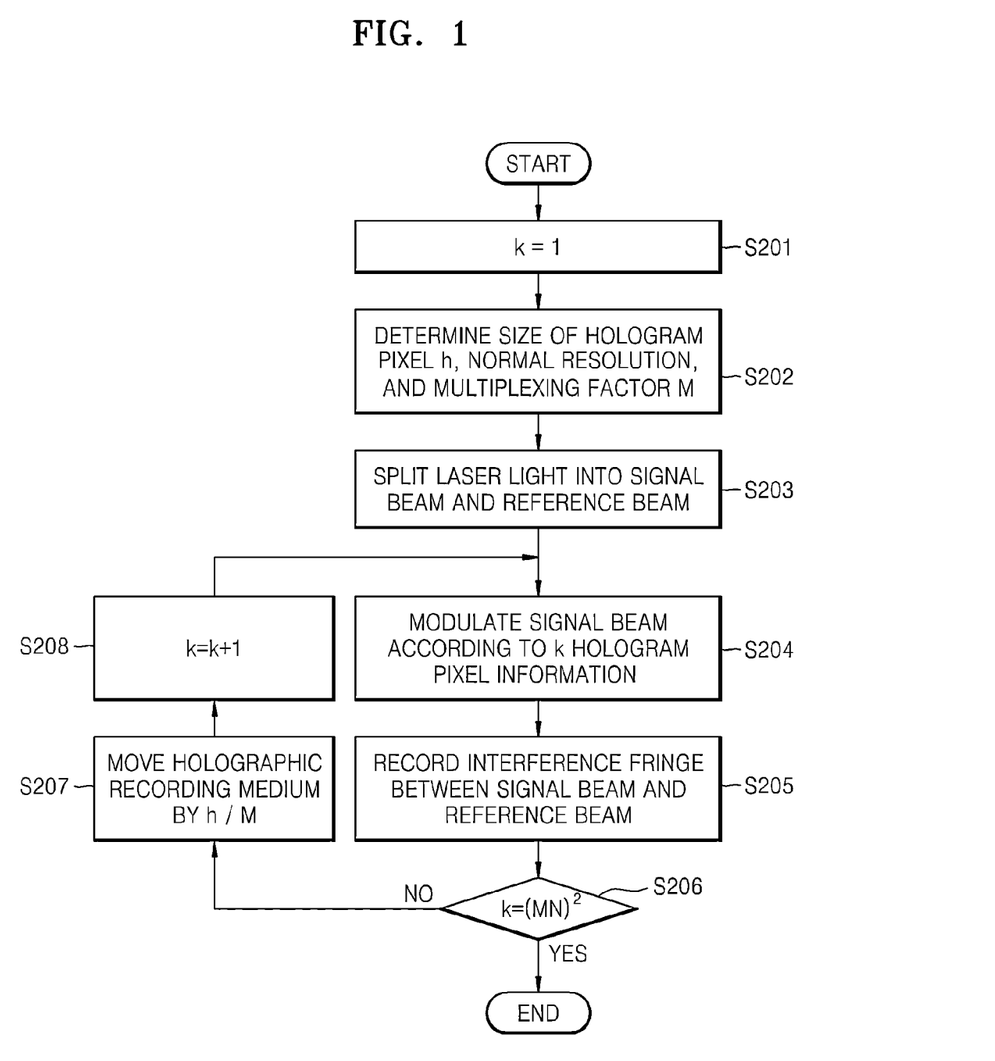
FIG. 1 is a flow chart of a holographic recording method according to an exemplary embodiment.
Figure 2A:
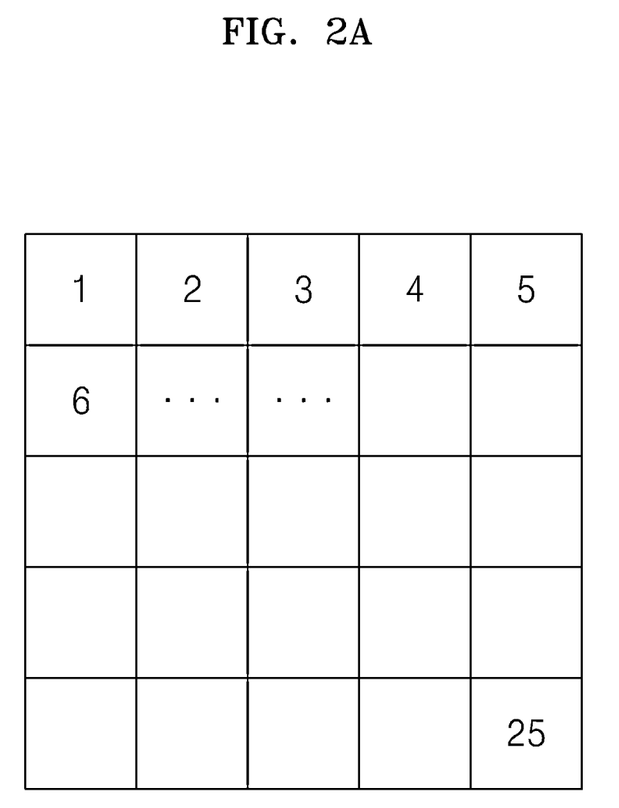
FIG. 2A is an exemplary hologram pixel arrangement of holographic devices not using a hologram pixel multiplexing method.
Figure 2B:
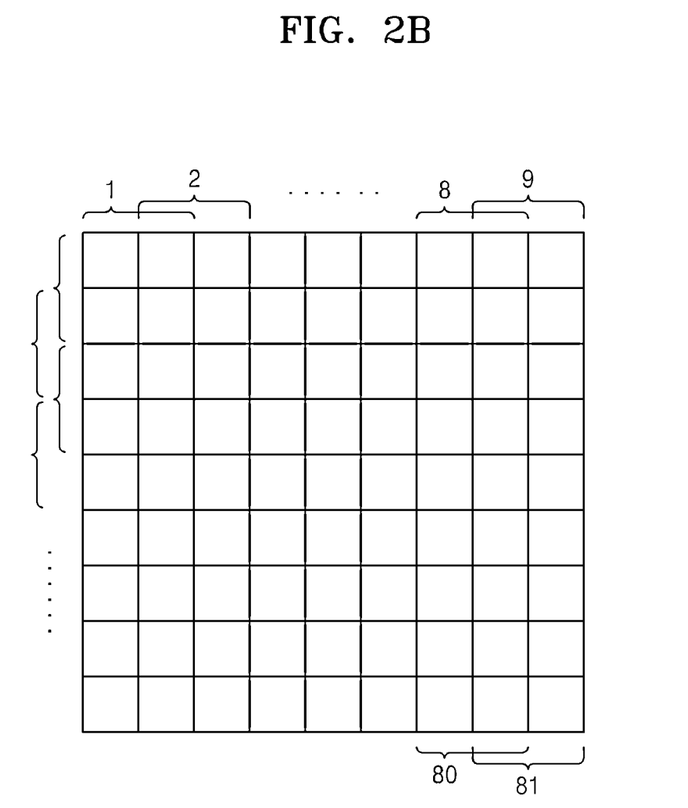
FIG. 2B is an exemplary hologram pixel arrangement of holographic devices using the hologram pixel multiplexing method according to an exemplary embodiment.

Exemplary embodiments of the present invention will be described in detail with reference to the accompanying drawings. In the drawings, like numeral references refer to like components and the dimension of each component may be exaggerated for clarity of description and for convenience. As used herein, the term "and/or" includes any and all combinations of one or more of the associated listed items. Expressions such as "at least one of," when preceding a list of elements, modify the entire list of elements and do not modify the individual elements of the list FIG. 1 is a flow chart of a holographic recording method according to an embodiment, and FIGS. 2A and 2B are exemplary hologram pixel arrangements of holographic devices according to a comparative example not using a hologram pixel multiplexing method and an embodiment using the hologram pixel multiplexing method, respectively.

In the holographic recording method according to an exemplary embodiment, an interference fringe between a reference beam and a signal beam modulated according to information regarding a plurality of hologram pixels is recorded on a holographic recording medium, and the method includes a process of multiplexing-recording hologram pixels so that at least a part of neighboring hologram pixels are overlapped.

The term "multiplexing-recording" refers to moving a holographic recording medium by a distance less than the width of a recorded hologram pixel and then recording a subsequent hologram pixel on a holographic recording medium, so that neighboring recorded hologram pixels are partially overlapped. Because the neighboring hologram pixels are partially overlapped on the holographic recording medium, the number of hologram pixels on a holographic recording medium of given size increases compared to the case where hologram pixels are not overlapped on a holographic recording medium.

The recording process will be described below in detail.

Initially, a value k is set to one in S201 and a size of a hologram pixel h, a normal resolution N, and a multiplexing factor M are determined in S202. In this case, the size of the hologram pixel h indicates that both the width and length of the hologram pixel are h, and the normal resolution N indicates that resolution implemented with a given hologram pixel size is N×N when multiplexing is not used. However, such figures are exemplary, the width and length of the hologram pixel size may be h1 and he respectively, and the normal resolution may be N1×N2. The multiplexing factor indicates the degree that neighboring hologram pixels are overlapped. When the multiplexing factor is M, the distance that a recording medium moves to record the next hologram pixel is 1/M of a width of the hologram pixel in a moving direction. The factor M may be a natural number.

For example, referring to FIGS. 2A and 2B, in the case shown in FIG. 2A in which hologram pixel multiplexing is not used, the number of hologram pixels is 25 and normal resolution is 5×5 for a given hologram pixel size. In FIG. 2B, the multiplexing factor is 2, eighty-one hologram pixels are recorded on the same region as FIG. 2A, and the resolution is 9×9. That is, if hologram pixel multiplexing is not used for a given hologram pixel size, resolution is N×N. Then if the hologram pixel multiplexing factor is M, resolution is (MN−(M−1))×(MN−(M−1)) and the number of recorded hologram pixels is (MN−(M−1))2.

Laser light is split into a signal beam and a reference beam in S203, and in S204 the signal beam is modulated according to information regarding a hologram pixel to be recorded. An interference fringe between the signal beam and the reference beam is recorded on a corresponding part of a holographic recording medium in S205 and the holographic recording medium is moved by h/M in S207.

Then the k value is incremented at S208 thus allowing for the signal beam to be modulated according to information regarding the next hologram pixel in S204, and recording the interference fringe between the signal beam and the reference beam on a corresponding part that has been changed is repeated in S205 until the number of hologram pixels becomes (MN−(M−1)) 2 which is checked at every iteration of the process at S206.

When recording is performed in this way, a recording time per hologram pixel, in particular, a time during which the holographic recording medium is exposed to light for each hologram pixel may be shortened as compared to when hologram pixel multiplexing is not used. If the multiplexing factor is 1, i.e., if hologram pixel multiplexing is not used, a time during which the holographic recording medium is exposed to light to record one hologram pixel is t. If the hologram pixel multiplexing factor is M, the time during which the holographic recording medium is exposed to light may be t/M. Thus, even if the number of hologram pixels increase and thus resolution increases, the total recording time does not increase because a recording time per hologram pixel decreases.

Figure 3A:
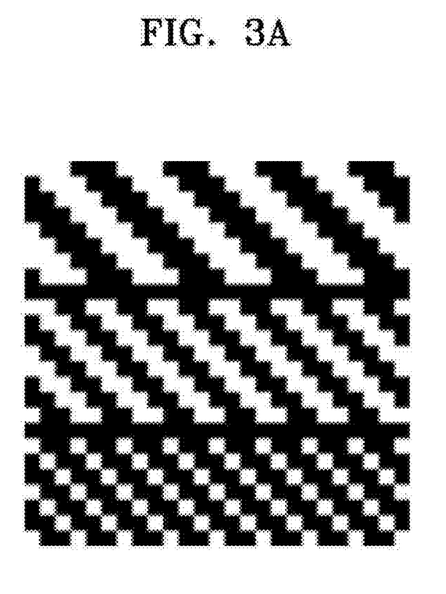
FIG. 3A is an image of a holographic device not using a hologram pixel multiplexing method.
Figure 3B:
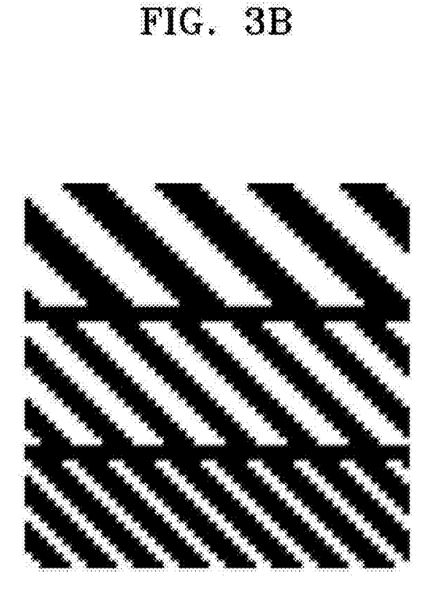
FIG. 3B is an image of a holographic device using the hologram pixel multiplexing method according to an exemplary embodiment.

FIGS. 3A and 3B are images of holographic devices according to a comparative example not using a hologram pixel multiplexing method and an embodiment using the hologram pixel multiplexing method, respectively;

FIG. 3A is an image of resolution 25×25 obtained by a typical technique, FIG. 3B is an image of resolution 50×50 obtained by a hologram pixel multiplexing technique, which may provide a visually identifiable increase in resolution as shown in FIG. 3B.

Figure 4A:
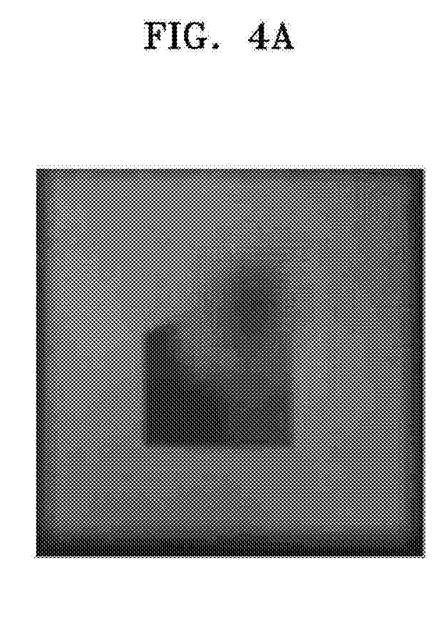
FIG. 4A is an image reproduced from a holographic device not using a hologram pixel multiplexing method.
Figure 4B:
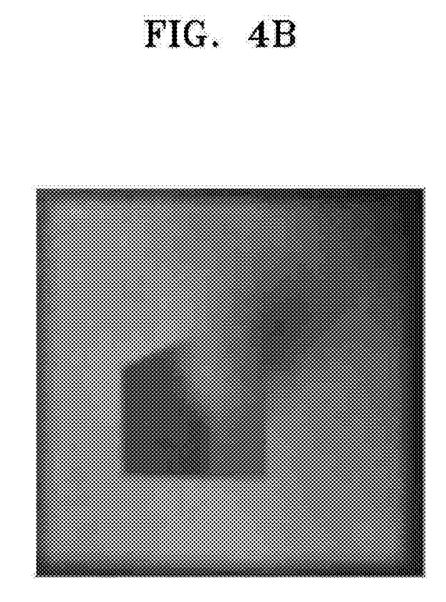
FIG. 4B is an image reproduced from a holographic device using the hologram pixel multiplexing method according to an exemplary embodiment.

FIGS. 4A and 4B are images reproduced from holographic devices according to a comparative example not using a hologram pixel multiplexing method and an embodiment using a hologram pixel multiplexing method, respectively.

The reproduced images are 3D images of a cube and globe that are focused on the cube. FIG. 4A shows an image of resolution 100×100 in which the hologram pixel multiplexing technique was not used, and FIG. 4B shows an image of resolution 200×200 in which a hologram pixel multiplexing technique was used. In FIG. 4B, the line representing the cube is more sharply represented.

Figure 5:
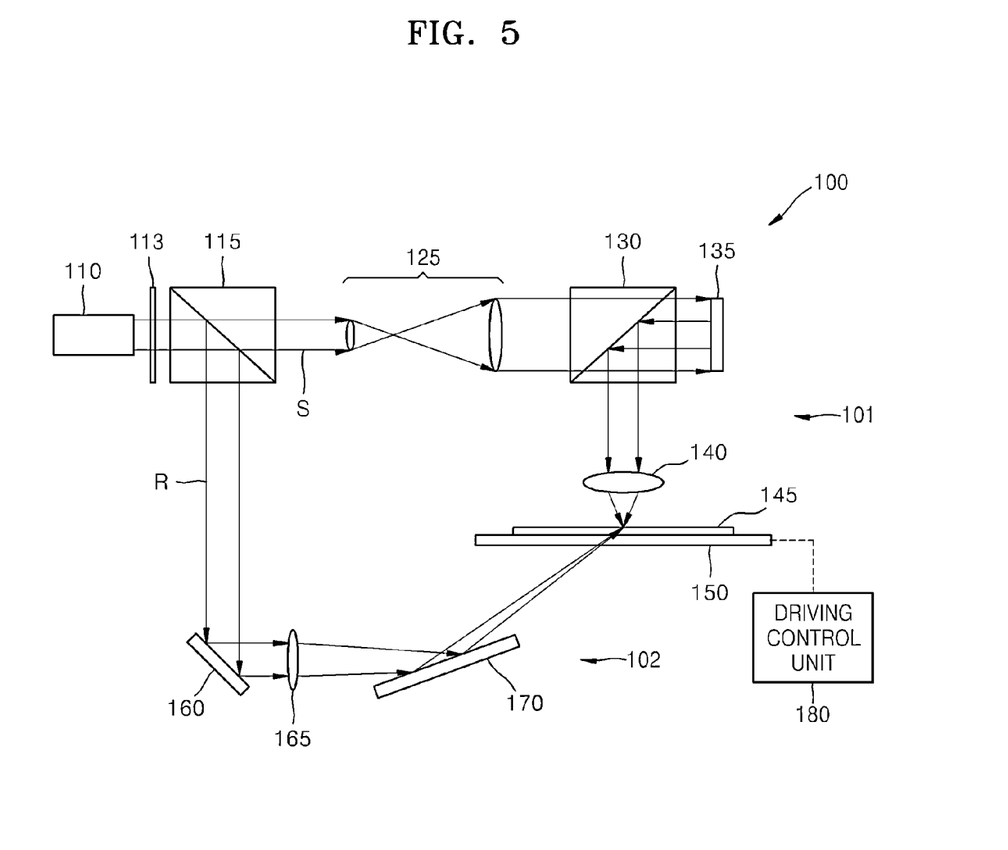
FIG. 5 shows a schematic configuration of a holographic recording apparatus according to an exemplary embodiment.

FIG. 5 shows a schematic configuration of a holographic recording apparatus 100 according to an exemplary embodiment.

The holographic recording apparatus 100 illustratively shows an apparatus for performing the holographic recording method according to an exemplary embodiment.

The holographic recording apparatus 100 includes a light source 110, a signal beam optical system 101, a first beam splitter 115 that splits light emitted from the light source 110 into a reference beam R and a signal beam S and, where the apparatus also modulates the split signal beam S according to information regarding a hologram pixel, and radiates the modulated beam to the holographic recording medium 145, a reference beam optical system 102 radiating the reference beam R to the holographic recording medium 145, a shutter 113 that is opened/closed to regulate a time during which the holographic recording medium 145 is exposed to light, a stage 150 on which the holographic recording medium 145 is arranged and which moves so that a position of the holographic recording medium 145 on which the interference fringe between the signal beam S and the reference beam R is recorded is changed according to a hologram pixel, and a driving control unit 180 that controls a movement of the stage 150. In another exemplary embodiment, the reference beam and signal beam could be arranged and moved to a position such that the beams are recorded at a different position according to a hologram pixel similar to having moved a stage on which a holographic recording medium is disposed.

In the holographic recording apparatus 100 according to an exemplary embodiment, after one hologram pixel is recorded, the stage 150 moves so that the next hologram pixel may be recorded. In this manner, recording is performed on the holographic recording medium 145 to enable at least some of neighboring hologram pixels to be overlapped. The driving control unit controls the stage 150 so that the stage moves by a distance less than a width of a recorded hologram pixel.

In addition, the holographic recording apparatus 100 may further include an input unit (not shown) for inputting how much neighboring hologram pixels are to be overlapped, i.e., for inputting a multiplexing factor M. If a width of a hologram pixel to be recorded is h, the driving control unit may move the stage 150 by h/M.

In addition, the shutter 113 is opened/closed to regulate a time during which the holographic recording medium 145 is exposed to light, and if the multiplexing factor is 1, a time during which the holographic recording medium 145 is exposed to light to record one holographic pixel is t. In this case, if the multiplexing factor is M, the shutter may be controlled so that it is kept open for a time t/M to record one holographic pixel.

According to one or more exemplary embodiments, a more detailed configuration of a holographic recording apparatus 100 is as follows.

A laser light source outputting coherent light may be used as the light source 110, and a laser light source emitting continuous wave (CW) laser or quasi-CW laser may be used, for example.

The signal beam optical system 101 splits a beam from the light source 110 into a reference beam R and a signal beam S, modulates the split signal beam S according to information regarding a hologram pixel, and radiates the modulated beam to the holographic recording medium 145. To that end, the signal beam optical system 101 includes a beam splitting/expanding unit, a spatial light modulator 135, and an objective lens unit 140.

The beam splitting/expanding unit may include a first beam splitter 115 that splits a beam from the light source 110 into a reference beam R and a signal beam S, and a beam expanding unit 125 that is arranged on an optical path of the signal beam S.

The first beam splitter 115 may be, for example, a half mirror, transmitting approximately 50% of incident light to allow the transmitted light to be used as the signal beam S, and reflecting approximately 50% of incident light to allow the reflected light to be used as the reference beam R. Such a ratio is exemplary, and the ratio of the signal beam to the reference beam may be set as other values. In addition, although FIG. 5 shows that the light penetrating the first beam splitter 115 is the signal beam S and the light reflected from the first beam splitter 115 is the reference beam R, these are exemplary. For example, in other embodiments, an optical arrangement of the holographic recording apparatus 100 may be changed so that the light penetrating the first beam splitter 115 is the reference beam R and the light reflected from the first beam splitter 115 is the signal beam S.

For example, the beam expanding unit 125 may expand a size of the signal beam to correspond to an effective optical modulation region of the spatial light modulator (SLM) 135, and may include a plurality of optical devices including one or more lenses. The beam expanding unit 125 may include a pair of relay lenses as shown but is not limited thereto.

A filter (not shown) may be arranged between the light source 110 and the first beam splitter 115 as needed. For example, a band pass filter may be arranged to transmit only light in a specific band of wavelengths.

The spatial light modulator 135 modulates the signal beam according to image information to be formed on the holographic recording medium 145 and may use, for example, a liquid crystal on silicon (LCOS) device.

The spatial light modulator 135 may be reflective and, in this case, the second beam splitter 130 may be arranged between the beam expanding unit 125 and the objective lens unit 140 as shown. The second beam splitter 130 splits a beam so that light from the beam expanding unit 125 is directed to the spatial light modulator 135 and light modulated by the spatial light modulator 135 is directed to the objective lens unit 140.

The second beam splitter 130 may be a half mirror that reflects some of incident light and transmits the rest of incident light. Alternatively, the second beam splitter 130 may be a polarization beam splitter that transmits or reflects light depending on polarization direction of incident light. In this case, a polarization plate (not shown) transmitting only light with a specific polarization direction may be arranged on an optical path directed to the second beam splitter 130 and, in addition, a quarter wave plate (not shown) may be arranged between the second beam splitter 130 and the spatial light modulator 135.

The above description relates to a case in which the spatial light modulator 135 is a reflective spatial light modulator and is exemplary, and a transmissive spatial light modulator (not shown) may also be employed. In this case, the transmissive spatial light modulator may be arranged between the beam expanding unit 125 and the objective lens unit 140. In addition, an optical path changing member (not shown) that allows light from the beam expanding unit 125 to change its optical path and to enter the transmissive spatial light modulator may be arranged in place of the second beam splitter 130.

The objective lens unit 140 is provided to function as a Fourier transformation optical system that performs a Fourier transform on a signal beam modulated from the spatial light modulator 135, i.e., a signal beam containing image information, and focuses the transformed beam on the holographic recording medium 145. FIG. 5 shows two objective lens units 140 and 165 in total; however, this is only an example, and two or more lenses or other optical devices may be included.

The reference beam optical system 102 is used for delivering the reference light R split from the first beam splitter 115 to the holographic medium 145 and includes an objective lens 165 and at least one mirror for regulating an optical path. FIG. 5 shows two mirrors 160 and 170; however, this is only an example, and variations may be made. For example, in order for the reference beam R to be able to enter a desired position of the holographic recording medium 145 at a desired angle, the mirrors 160 and 170 may be configured to be rotatable and movable. In particular, the reference beam optical system 102 may be configured so that the reference beam R enters the same position of the holographic recording medium 145 where the signal beam S has entered. In addition the reference beam optical system 102 may be configured so that a sectional area of the reference beam R matches that of the signal beam S on the holographic recording medium 145.

For the above-described holographic recording apparatus 100, an interference fringe made while the signal beam S containing image information meets with and interferes with the reference beam R on the holographic recording medium 145 is recorded on the holographic recording medium 145.

After recording one hologram pixel, the driving control unit moves the stage 150 by a distance less than a width of a hologram pixel, e.g., h/M, and records the next hologram pixel to perform recording in a multiplexing technique. In this case, h is a width of a hologram pixel in a moving direction, and M is a multiplexing factor and a natural number that is larger than 1.

By such recording, a plurality of hologram pixels is arranged so that at least a part of neighboring hologram pixels are overlapped, and a holographic device of resolution $(MN-(M-1))\times(MN-(M-1))$ is thus formed, the resolution of which is higher than a resolution $N\times N$ that is obtained when multiplexing is not performed.

In addition, because a recording time per hologram pixel decreases, the total recording time does not increase even if resolution increases. For example, the recording time per hologram pixel may be approximately the sum of an exposure time during which the holographic recording medium 145 is exposed to light, a stage moving time, and a standby time. A time during which the holographic recording medium 145 is exposed to light to record one hologram pixel, i.e., a shutter 113 open time, decreases to 1/M when multiplexing is performed as compared to when multiplexing is not performed. Since the stage moving distance decreases to 1/M and it may thus be considered that the stage moving time and the standby time may also decrease to approximately 1/M, a time to record the whole hologram pixels does not increase.

According to the above-described holographic recording method and apparatus, it is possible to change resolution related to holographic recording by changing moving step of hologram pixels.

In addition, because a recording time per hologram pixel decreases even if resolution is enhanced, the total recording time does not increase.

In addition, because the recording time per hologram pixel decreases, recording quality is less sensitive to high-frequency vibration resulting from a movement of the stage.

While the present invention has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A holographic recording method in which an interference fringe between a reference beam and a signal beam modulated according to information regarding a plurality of hologram pixels is recorded on a holographic recording medium, the holographic recording method comprising:
    multiplexing-recording the interference fringe of the plurality of hologram pixels such that at least a part of the interference fringe recorded of neighboring hologram pixels of the plurality of hologram pixels is overlapped, the plurality of hologram pixels comprising a first hologram pixel and a second hologram pixel, and the interference fringe comprising a first interference fringe of the first hologram pixel and a second interference fringe of the second hologram pixel; and
    determining a multiplexing factor M that is greater than 1, wherein the multiplexing-recording comprises:
        recording the first interference fringe of the first hologram pixel using a signal beam modulated according to information regarding the first hologram pixel and a reference beam; and
        recording the second interference fringe of the second hologram pixel using a signal beam modulated according to information regarding the second hologram pixel and the reference beam, wherein the holographic recording medium is exposed to light during an exposure time of t/M to record the first interference fringe, and wherein t denotes a time during which the holographic recording medium is exposed to light to record the first interference fringe without multiplexing.

2. The holographic recording method of claim 1, wherein the multiplexing-recording further comprises:

moving the holographic recording medium by a distance less than a width of the recorded first interference fringe of the first hologram pixel.

3. The holographic recording method of claim 2, wherein the moving of the holographic recording medium comprises moving the holographic recording medium by a distance h/M, wherein a width of the recorded first interference fringe of the first hologram pixel is h.

4. A holographic recording apparatus comprising:
a light source;
a signal beam optical system configured to:
split light from the light source into a reference beam and a signal beam,
modulate the signal beam according to information regarding a hologram pixel, and
radiate the modulated beam to a holographic recording medium;
a reference beam optical system configured to radiate the reference beam to the holographic recording medium;
a shutter configured to be opened and closed to regulate a time during which the holographic recording medium is exposed to light;
a stage on which the holographic recording medium is arranged,
wherein the stage is configured to move according to the hologram pixel and to change a position of the holographic recording medium on which an interference fringe of the hologram pixel is recorded;
a driving control unit configured to control the stage such that movement of the stage is within a distance less than a width of a recorded hologram pixel when the stage records a first hologram pixel and then moves to record a second hologram pixel; and
an input unit configured to receive a multiplexing factor M that is greater than 1,
wherein the first hologram pixel is recorded by a first interference fringe of a first signal beam modulated according to information regarding the first hologram pixel and the reference beam,
wherein the second hologram pixel is recorded by a second interference fringe of a second signal beam modulated according to information regarding the second hologram pixel and the reference beam,
wherein the shutter remains open during an exposure time of t/M to record the first interference fringe of the first hologram pixel, and
wherein t denotes a time during which the holographic recording medium is exposed to light to record the first interference fringe of the first hologram pixel without multiplexing.

5. The holographic recording apparatus of claim 4, wherein when the width of the recorded interference fringe of the first hologram pixel is h, the driving control unit moves the stage by h/M.

6. The holographic recording apparatus of claim 4, wherein the signal beam optical system comprises:
a beam splitting and expanding unit configured to split the light from the light source into the reference beam and the signal beam and expand a diameter of the signal beam;
a spatial light modulator configured to modulate the signal beam according to information regarding the hologram pixel; and
an objective lens unit configured to focus the signal beam modulated by the spatial light modulator onto a holographic recording medium.

7. The holographic recording apparatus of claim 6, wherein the beam splitting and expanding unit comprises:
a first beam splitter configured to split the light from the light source into the reference beam and the signal beam; and
a pair of relay lenses arranged on an optical path of the signal beam and configured to expand the signal beam.

8. The holographic recording apparatus of claim 6, wherein the spatial light modulator is a reflective spatial light modulator.

9. The holographic recording apparatus of claim 8, further comprising:
a beam splitter arranged between the beam splitting and expanding unit and the objective lens unit, wherein the beam splitter is configured to direct the light from the beam splitting and expanding unit to the spatial light modulator and direct the signal beam modulated by the spatial light modulator to the objective lens unit.

10. The holographic recording apparatus of claim 6, wherein the spatial light modulator is transmissive.

11. The holographic recording apparatus of claim 10, wherein the spatial light modulator is arranged between the beam splitting and expanding unit and the objective lens unit.

12. The holographic recording apparatus of claim 11, further comprising:
an optical path changing member arranged between the beam splitting and expanding unit and the spatial light modulator,
wherein the optical path changing member is configured to redirect the light output from the beam splitting and expanding unit to the spatial light modulator.

13. The holographic recording apparatus of claim 4, wherein the reference beam optical system comprises:
an objective lens configured to focus the reference beam onto the holographic recording medium; and
at least one mirror configured to regulate an optical path.

14. The holographic recording method of claim 1, wherein the multiplexing-recording further comprises:
moving the reference beam and the signal beam by a distance less than a width of the recorded interference fringe of the first hologram pixel.

* * * * *